United States Patent [19]

Gaeddert et al.

[11] 4,252,057
[45] Feb. 24, 1981

[54] BALE TENSIONING APPARATUS IN A ROTARY BALER

[75] Inventors: Melvin V. Gaeddert, Newton; Bobby D. McWhirt, Hesston, both of Kans.

[73] Assignee: Hesston Corporation, Hesston, Kans.

[21] Appl. No.: 45,197

[22] Filed: Jun. 4, 1979

[51] Int. Cl.³ .......................... A01D 39/00; B30B 5/06
[52] U.S. Cl. .......................................... 100/88; 56/341
[58] Field of Search .................... 100/88; 56/341, 343, 56/344

[56] References Cited

U.S. PATENT DOCUMENTS

| | | | |
|---|---|---|---|
| 3,931,702 | 1/1976 | Steropulos et al. | 100/88 X |
| 4,169,347 | 10/1979 | Phillips | 56/341 |
| 4,182,101 | 1/1980 | Gaeddert et al. | 56/341 |

*Primary Examiner*—Edward L. Roberts
*Attorney, Agent, or Firm*—Schmidt, Johnson, Hovey & Williams

[57] ABSTRACT

Forming belts and an overhead device within the chamber of the baler apply a compacting force to the bale during its formation, the belts also serving to drive the bale in a rolling motion so as to coil up new hay material continuously being presented to the chamber. The position of opposed, oppositely moving stretches of the belts essentially determines the variable horizontal dimensions of the chamber, while the position of the overhead device, which draws together and retains the belt stretches, essentially governs the vertical dimension of the chamber. Both the belt-retaining device and a slack-takeup roller for the belts are carried by a common support that progressively swings further and further from the bottom of the chamber under resistance during bale growth to pay out additional belt length and to continue compaction of the bale. The support has a special lever at its outer end which carries the retaining device on one side of the fulcrum point of the lever and the takeup roller on the opposite side of the fulcrum point such that, if necessary during the forming cycle, the lever can rock to the extent necessary about its fulcrum point under a light-spring resistance to accommodate the entry of sudden slugs into the baling chamber without the paying out of undesired amounts of slacks to the belts. Bale density may be adjusted via an arrangement which permits adjusting the effective length of a force-transmitting crank located between the springs that provide tension for the belts and the slack takeup for the belts themselves.

15 Claims, 8 Drawing Figures

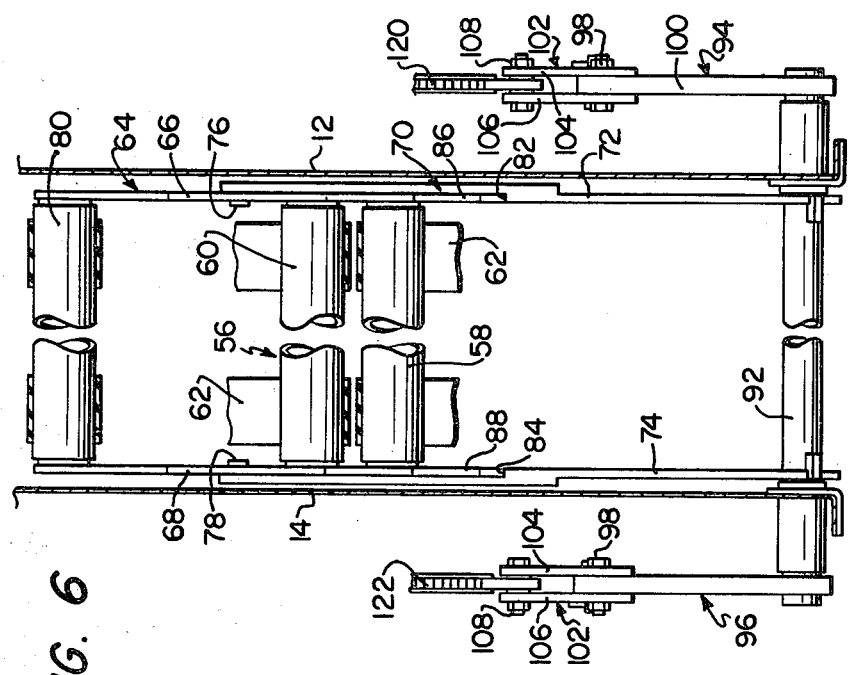
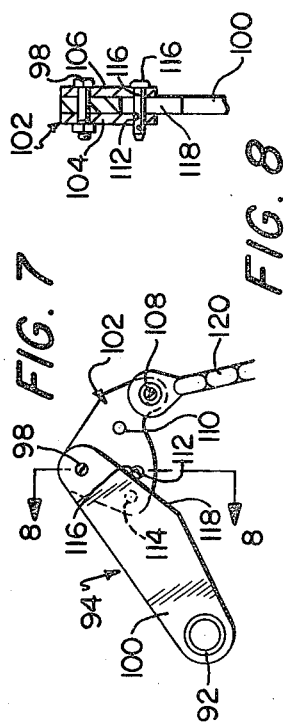
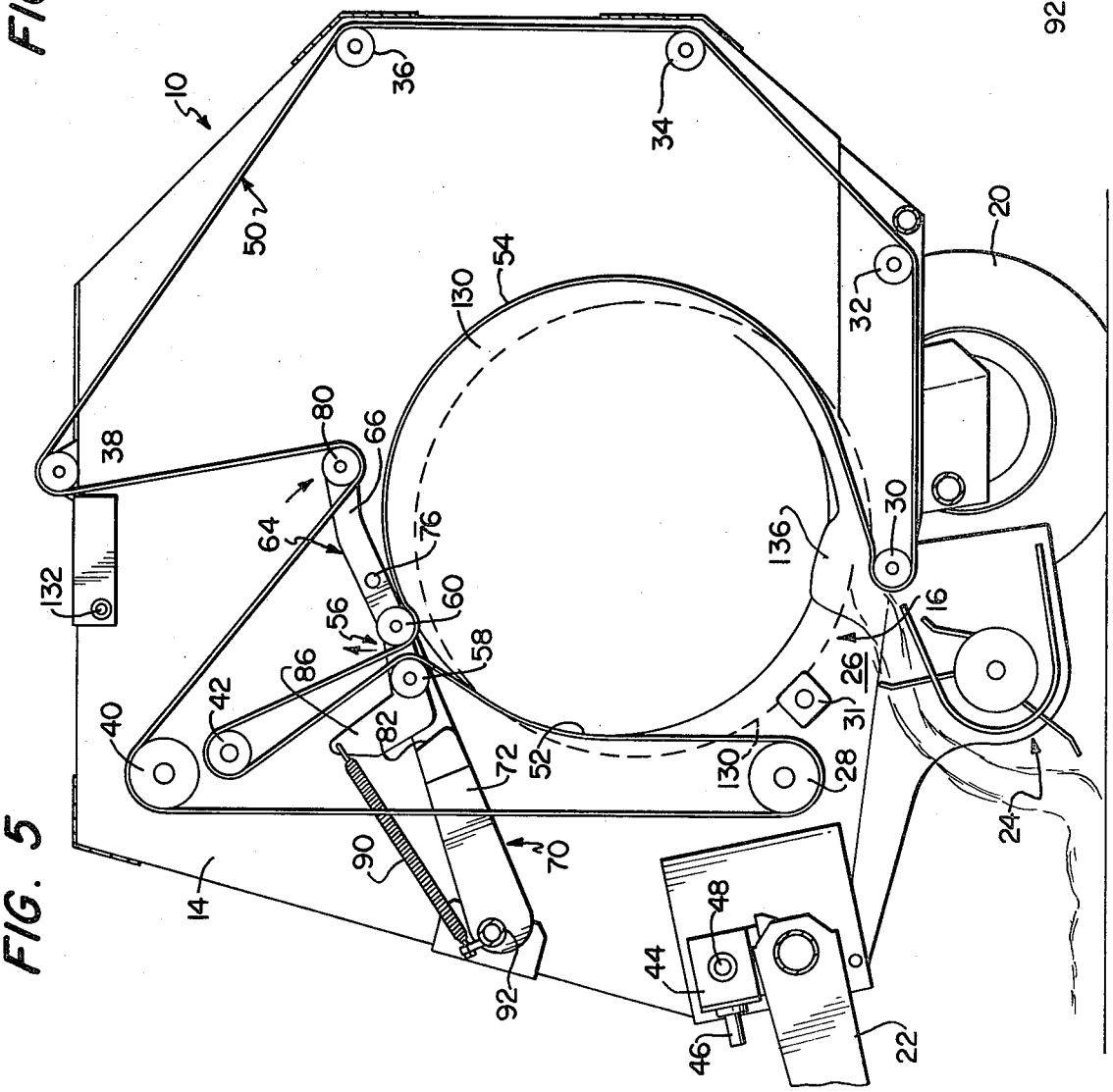

BALE TENSIONING APPARATUS IN A ROTARY BALER

TECHNICAL FIELD

This invention relates to the field of rotary balers, particularly that class of so-called "round" balers capable of making larger, cylindrical or "round" bales on the order of 1500 lbs. or more.

BACKGROUND ART

In some rotary balers presently available the application of compressive forces to the bale during its formation is carried out by two separate structures under the influence of two separate biasing means. For example, flexible belting may be utilized to partially envelope the bale and thus serve as one of the mentioned structures. Additionally, a rigid grid or the like might be employed to encompass yet another part of the bale, the grid swinging to a position effectively enlarging the chamber as the bale grows and the belts likewise being paid out by a slack-control unit as the bale grows to also contribute to enlargement of the bale chamber.

In having such two separate yet cooperating strucutres, it sometimes becomes difficult to properly maintain a balanced application of compressive forces to the bale. That is, the force from the grid might tend to become greater than the force from the belts or vice versa, in which event the bale might tend to take on a transversely elliptical configuration as opposed to the desired transversely circular shape.

Furthermore, the use of two separate systems in this manner necessitates greater material costs and other attendant expenses which would desirably be reduced without sacrificing quality of the finished bale or ease of operation.

Additionally, it has been found that it is most desirable to provide for adjustment of the compacting or compressing force applied to the bale during its formation since varying conditions such as moisture levels, types of crops being harvested, and climate have a direct effect upon the nature of the bale produced by the machine. For example, when harvesting an alfalfa crop, the moisture level in the crop and the nature of the crop itself is normally such that a dense, relatively heavy bale can be produced with perhaps lighter-than-usual tension on the forming belts, but on the other hand, if light prairie grasses are being harvested, the operator normally needs considerably greater compressive forces on the belts throughout the major part of the cycle.

By the same token, however, adjustment in the tension applied to the forming belts is desirably such that the amount of tension on the belts when the chamber is empty at the beginning of the cycle is not adversely affected one way or the other. Still further, if adjustments of this type are to be made, it is imperative that they be capable of being carried out with speed and ease for many reasons known by those skilled in the art.

SUMMARY OF THE INVENTION

Accordingly, one important object of the present invention is to provide a rotary baler in which the structures for controlling the size of the bale chamber and the compressive forces applied to the bale during formation are integrated into a common unit so as to achieve the functional and cost-related benefits incident to such an arrangement.

Another important object of the present invention is to provide such an integrated unit with the ability to momentarily accommodate sudden slugs of crop material entering the bale chamber without excessive slackening of the driving belts or other web means utilized in connection with the bale. If the belts are otherwise permited to momentarily go slack, the result is termination of the rolling motion experienced by the bale, to the end that no more material may be accepted into the bale chamber without seriously clogging the entry portion thereof.

A still further important object of the invention is to provide the ability to adjust the tension on the forming web or belts with speed and ease so as to accommodate varying crop conditions and other factors.

Pursuant to the above objectives, the present invention contemplates the use of a set of side-by-side, endless belts held apart at a lower location in the baler so as to define a bottom entrance to a baling chamber defined in part by the belts. At a location spaced away from the entrance, opposing stretches of the belts are held close together by a retaining device which itself can move toward and away from the bottom entrance so as to reduce or enlarge the chamber, depending upon the direction of movement. Such retaining device is mounted on a common arm with a slack-takeup roller for the belts such that a yieldable force resisting movement of the retaining device away from the chamber entrance is likewise distributed to the slack-takeup roller in a balanced manner.

A special lever pivoted to the outer end of the arm carrier the retaining device at one side of the lever's fulcrum point and the slack-takeup roller on the opposite side of the fulcrum point, the lever being held in such a position by a light-duty spring that can rock as necessary when the retaining device is forced momentarily and adruptly upwardly by the bale during entry of a sudden slug of material into the chamber. While this motion pays out a certain amount of belt from the retaining device so as to permit enlargement of the chamber in a vertical dimension, the slack-takeup roller on the opposite end of the lever swings in the opposite direction at that time so as to correspondingly take up a certain amount of slack, thereby preventing the belts from assuming an excessively slack condition during that time frame.

A crank which is disposed intermediate the earlier-mentioned arm and the source of tensioning force for the arm has a joint intermediate its opposite ends which permits the crank to buckle as the crank is swung by the arm under reistance from the tensioning springs. Consequently, the effective length of the crank is shortened during such swinging movement to reduce the mechanical advantage of the tension springs over the crank in the course of the latter's swinging motion and to likewise reduce the extent to which the springs would otherwise be stretched. A variable position stop associated with the two buckling sections of the crank may be utilized to limit the extent of the buckling in accordance with the amount of tensioning force desired to be applied by the belts and the overhead arm associated therewith after startup of the bale.

BRIEF DESCRIPTION OF THE DRAWINGS

FIG. 5 is a diagramatic view of the baler with the left sidewall removed illustrating the action which occurs when a sudden slug of crop material enters the bale chamber;

FIG. 6 is a fragmentary, cross-sectional view through the baler taken substantially along line 6—6 of FIG. 1;

FIG. 7 is an enlarged, fragmentary detail view of the buckling crank associated with the tension springs of the baler; and FIG. 8 is a fragmentary, cross-sectional view thereof taken substantially along line 8—8 of FIG. 7.

DETAILED DESCRIPTION

Figure 2:
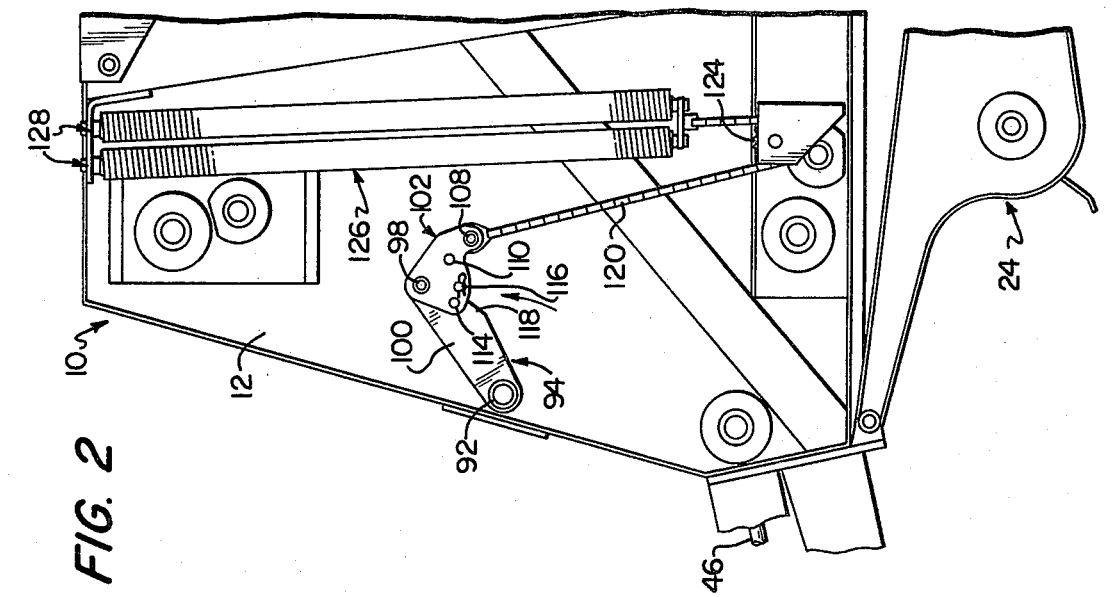
FIG. 2 is a fragmentary, side elevational view thereof similar to FIG. 1 but showing the condition of the tension springs and associated crank when the bale has grown to substantially full size within the interior, bale-forming chamber.

The baler 10 has a pair of laterally spaced apart sidewalls 12 and 14 that cooperate to provide the lateral extremities of a bale-forming chamber denoted broadly by the numeral 16. Although the positions of the sidewalls 12 and 14 relative to each other are fixed such that the lateral extremities or dimensions of the chamber 16 are likewise fixed, the vertical dimension of the chamber 16 as well as its fore-and-aft dimension is subject to change throughout the period that a bale is forming within the chamber 16 as will subsequently appear.

The sidewalls 12 and 14 are carried on a suitable chassis which is in turn carried by a pair of ground wheels 18 and 20 located on opposite sides of the baler 10 outboard of the respective sidewalls 12 and 14. A fore-and-aft extending tongue 22 located adjacent the front end of the baler 10 relative to its normal direction of travel adapts the same to be hitched behind a towing tractor or the like for advancement across a field having windrowed crop material deposited thereon. A pickup 24 spaced rearwardly from the front extremity of the sidewalls 12,14 and located substantially directly beneath the chamber 16 is operable to pick up windrowed material from the field as the baler 10 passes over the same and to feed such material up into the chamber 16 through an entrance 26 defined between a pair of transversely extending rolls 28 and 30 spanning the sidewalls 12,14 and located in fore-and-aft spaced relationship to one another. A cross-sectionally polygonal roller 31 spanning sidewalls 12,14 and situated rearwardly adjacent front roll 28 keeps the bale off roll 28 during formation.

Also spanning the sidewalls 12,14 are additional rolls arranged in a generally circular pattern progressing in a counterclockwise direction from the roll 30, such rolls being identified by the numerals 32, 34, 36, 38, 40 and 42. The rolls 30-38 and 42 are all idler rolls, while the roll 28 and optionally also the roll 40 are rotatively driven in a clockwise direction viewed in FIG. 3 by mechanism not illustrated. Such driving mechanism may take several different forms readily understood by those skilled in the art, and it is contemplated that a right angle gearbox 44 situated on top of the tongue 22 adjacent its rearmost end may be provided with an input shaft 46 ultimately couplable with the power-takeoff shaft (not shown) of the towing vehicle, the gearbox 44 also having an output shaft 48 at right angle to the input shaft 46 from which the driving mechanism above-mentioned may receive its power for driving the roll 28 and optionally also the roll 40.

Figures 3, 4:
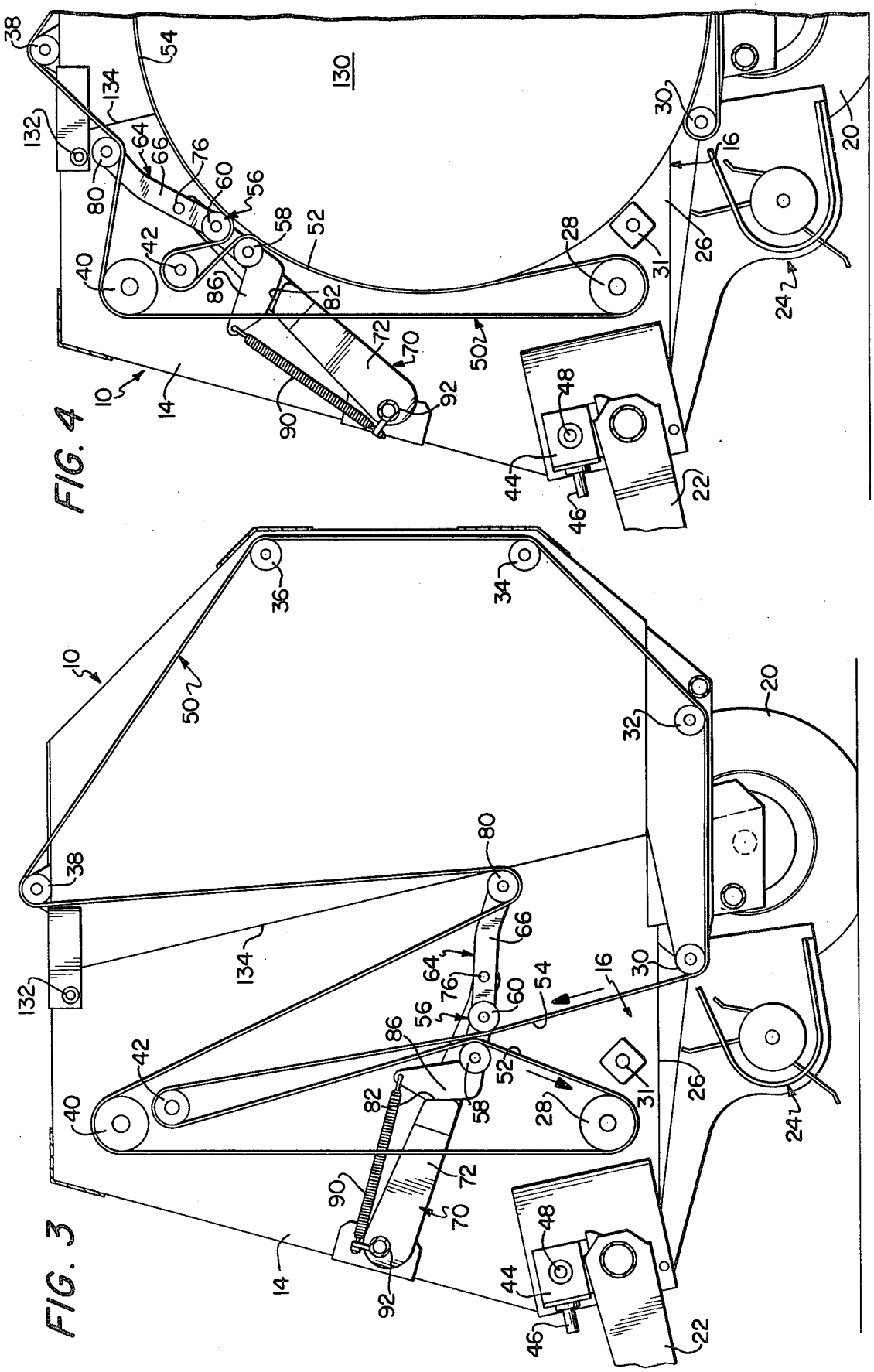
FIG. 3 is an elevational view similar to FIG. 1 but with the left sidewall of the baler removed to reveal internal details.
FIG. 4 is a view of the baler similar to FIG. 3 but with the internal components thereof in a condition corresponding to that of FIG. 2 when the bale is essentially full size.

The bale chamber 16 is further defined by structure in the form of an endless, flexible web broadly denoted by the numeral 50 which is looped over the roll 42 and under the rolls 28,30 in such a manner as to present a pair of generally upright, opposed web stretches 52 and 54 which, as illustrated in FIG. 3, initially move in opposite vertical directions. The web stretches 52,54 are held apart at their lower ends by the rolls 28,30 such as to present the entrance 26, and the stretches 52,54 are held close together at a location above the entrance 26 by a retaining device 56 in the nature of a pair of elongated, fore-and-aft spaced apart rollers 58,60, thus effectively closing the periphery of the chamber 16 except at the entrance 26 thereof. As shown most clearly in FIG. 6, the web 50 preferably takes the form of a series of endless, identical belts 62 spaced a short distance apart across the baler 10 and between the sidewalls 12,14.

The rollers 58,60 are supported on a lever assembly 64 having a pair of levers 66,68 spanned by the rollers 58,60. The assembly 64 in turn is pivotally supported by an arm assembly 70 that includes a pair of arms 72,74 situated slightly inboard of the respective sidewalls 12,14. A pair of aligned pivots 76,78 at the outermost ends of the arms 66,68 attach the lever assembly 64 to the arm assembly 70 and serve as the fulcrum point for the levers 66,68. Hence, it may be said that the retaining device 56 is located on one side of the fulcrum point of the lever assembly 64 while a slack-takeup roller 80 spanning the levers 66,68 at the opposite end thereof is located on the opposite side of the fulcrum point of lever assembly 64. As illustrated, the web 50 is looped beneath the takeup-roller 80 after being looped over the rolls 38,40.

As illustrated in FIG. 6, the arms 72,74 of arm assembly 70 are generally longitudinally aligned with the levers 66,68 adjacent the inner ends of the arms 72,74 but at approximately midlength of the arms 72,74, the latter are joggled out such that the remaining portions of the arms 72,74 embrace the levers 66,68 on laterally outboard sides thereof. The points at which the arms 72,74 are joggled out present a pair of stops 82,84 respectively disposed to abuttingly engage upwardly projecting shoulders 86,88 on the proximal inner ends of the corresponding levers 66,68. Such abutting engagement of the stops 82,84 and the shoulders 86,88 serves to limit counterclockwise swinging of the lever assembly 64 about the pivots 76,78 relative to the arm assembly 70, and each of the shoulders 86,88 has a tension spring 90 (only one being shown) secured at one end thereto and at the opposite end to a remote point on the corresponding arm 72 or 74 for the purpose of yieldably biasing the shoulders 86,88 of lever assembly 64 against the stops 82,84 of arm assembly 70.

The arm assembly 70 is swingably mounted on the sidewalls 12,14 adjacent the front of the latter for generally vertically swinging movement toward and away from the lower rolls 28 and 30, thereby also rendering the retaining device 56 likewise shiftable toward and away from lower rolls 28 and 30. The arms 72,74 are interconnected adjacent their inner ends by a torque tube member 92 spanning the sidewalls 12,14 and journaled thereby so as to render the arm assembly 70 swingable in the above-described manner. The torque tube 92 projects outwardly through and beyond the sidewalls 12,14 for a short distance as illustrated in FIG. 6, at which location its opposite ends are respectively fixed to a pair of cranks 94 and 96 that are thereby caused to swing with the arm assembly 70 during the latter's movement toward and away from the lower rolls 28,30.

Each of the cranks 94,96 has a pivot 98 intermediate its opposite ends defining a joint for buckling and unbuckling of the crank 94,96 during operation as will subsequently be described. As a result of the pivotal joint 98, each crank 94,96 has an inner section 100 affixed to the proximal end of the torque tube 92 on one side of the pivot 98 and an outer section 102 situated on the other side of the pivot 98. The inner section 100 is fabricated from a single piece of bar stock or the like, but the outer section 102 is fabricated from a pair of plates 104 and 106 that embrace opposite sides of the inner section 100 and are held in such embracing relationship by suitable means associated with the pivot 98 and by second fastener means 108 located at the outer tip end of the plates 104,106. The plates 104,106 are provided with a circumferential series of aligned apertures 110, 112 and 114 situated at a common radial distance from the pivot 98, and such apertures 110, 112 and 114 may selectively receive a limit pin 116 that spans the plates 104,106 in disposition for abutting engagement with the proximal edge 118 of the inner section 100 after a predetermined amount of buckling of the crank 94 or 96. Manifestly, which of the apertures 110, 112 or 114 is selected to receive the pin 116 determines the extent to which the crank 94 or 96 will be allowed to buckle about the pivot 98 before pin 116 comes into engagement with the edge 118. A greater degree of buckling will be permitted when the pin 116 is in the apertures 110 than when it is in the apertures 114, for example.

Figure 1:
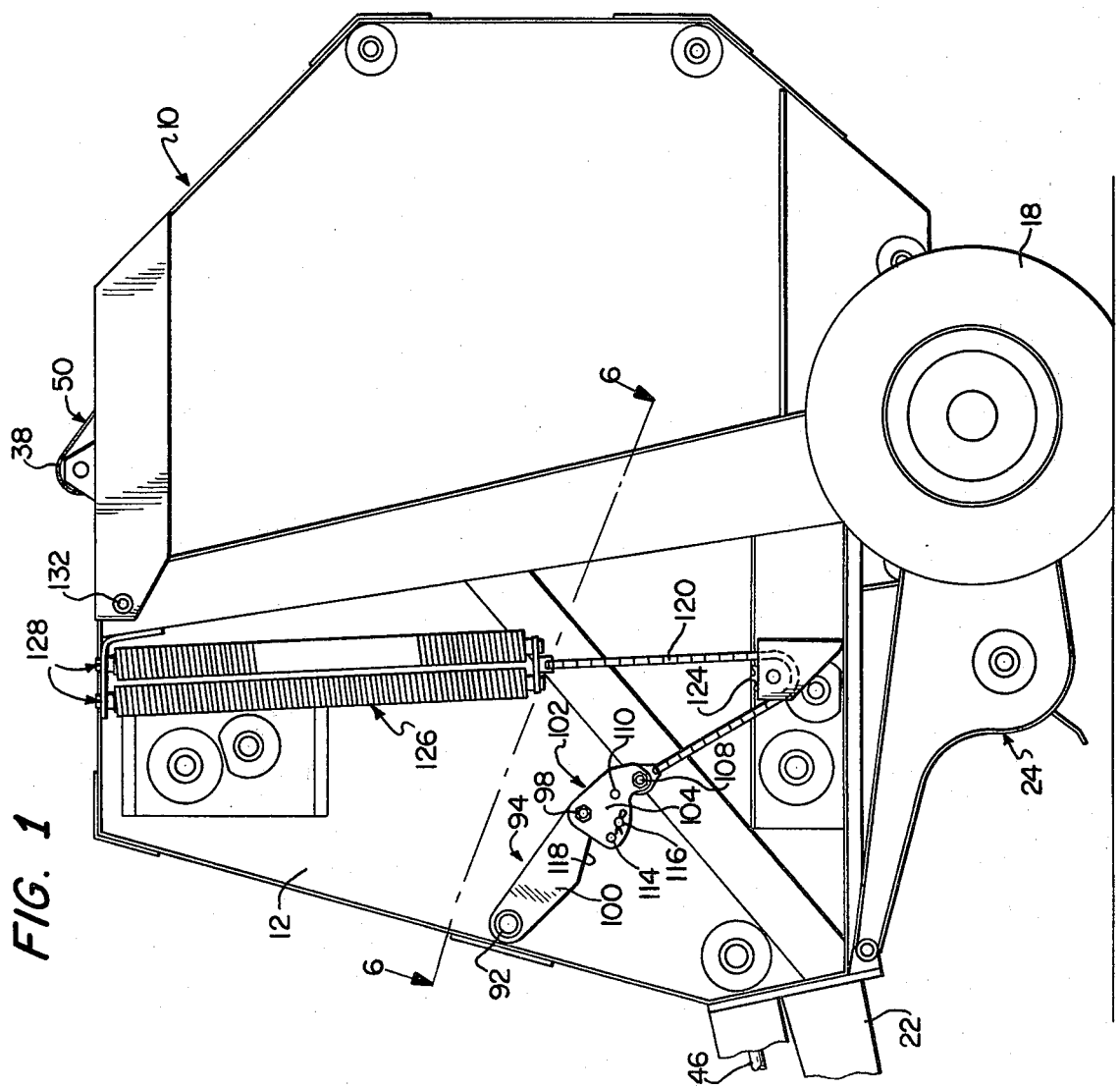
FIG. 1 is a fragmentary, left side elevational view of a baler constructed in accordance with the principles of the present invention.

The outermost ends of the cranks 94,96 are respectively connected to a pair of roller chains 120 and 122 fastened to the respective outer sections 102 at the fasteners 108. Each of the chains 120,122 is in turn looped beneath an idler sprocket 124 (only one being shown) located rearwardly from the corresponding crank 94 or 96 adjacent the lower extremity of the corresponding sidewall 12 or 14. From the idler sprockets 124, the chains 120,122 extend upwardly to corresponding tension spring assemblies 126 (only one being shown) anchored adjacent their upper ends to corresponding points adjacent the upper extremities of the respective sidewalls 12,14. Thus, the spring assemblies 126 provide yieldable force biasing the cranks 94,96 downwardly in a clockwise direction viewing FIGS. 1 and 2, for example, which likewise biases the arm assembly 70, the retaining device 56 and the slack-takeup roller 80 downwardly toward the lower rolls 28,30. As illustrated in FIG. 1 with respect to the crank 94, the line of force applied to the latter by tension springs 126 is generally radially directed with respect to the axis of swinging movement of the crank 94 when the latter is in its lowermost position corresponding to the closest postion of the arm assembly 70 to the lower rolls 28,30. Crank 94 is substantially unbuckled at this time with its sections 100,102 in generally end-to-end alignment such that the line of force transmitted by the chain 120, as aforesaid, is generally radial and generally intersects the axis of swinging movement of the crank 94.

Operation

When the bale chamber 16 is empty, such as at the beginning of the baling cycle, the components of the baler 10 are disposed in the condition illustrated by FIGS. 1 and 3. At such time, the arm assembly 70 is in its closest position to the lower rolls 28,30 such that the retaining device 56 is likewise in its lowermost position to maintain the chamber 16 at its smallest size. The cranks 94,96 are substantially wholly unbuckled as illustrated by the crank 94 in FIG. 1, yet the tension springs 126 are under a certain amount of preloading such that upward swinging of the cranks 94,96 and the arm assembly 70 is yieldably resisted. The particular amount of such preloading of the springs 126 may be varied by adjustment of suitable mechanism not shown in detail but which is associated with the springs 126 and is operable to adjust the stretched length of the spring assembly 126. Typically, such an arrangement might include suitable bolt and nut means broadly denoted by the numeral 128 at the point of connection of the springs 126 to the sidewall 12 or 14 which permit adjusting the position of the upper end of the springs 126 with respect to the anchor point of the assembly to the corresponding sidewall 12 or 14.

As the baler 10 advances along a crop windrow, the pickup 24 lifts the materials off the ground and feeds it up through the entrance 26 into the chamber 16 whereupon it is acted upon by the oppositely moving, generally vertically directed belt stretches 52 and 54 so as to cause the introduced material to tumble forwardly. As additional material is thus introduced into the chamber 16, the tumbling material begins to coil up into a bale and exert radially outwardly directed forces against the belt stretches 52,54 and against the rollers 58,60 of retaining device 56. Deflection of the belt stretches 52,54 and upward movement of the retaining device 56 is, of course, resisted by the tension springs 126.

As additional material continues to be fed into the chamber 16, a point is quickly reached whereat the bale core simply becomes too large for the small chamber 16 and the resistance of springs 126 is exceeded. At that point in time the arm assembly 70 begins to yield upwardly, causing the vertical dimension of the chamber 16 to increase as the rollers 58 and 60 swing upwardly toward their extreme positions of FIG. 4. This action not only raises the upper limit of the chamber 16, but also pays out additional lengths of the stretches 52,54. Furthermore, upward swinging of the arm 70 necessarily raises the takeup roller 80 which substantially increases the amount of belt length available to the stretches 52 and 54.

This process continues until the bale reaches essentially full size as illustrated in FIG. 4 (said bale being denoted by the numeral 130 in that figure), and at the point in time (but preferably after wrapping the bale 130 with a suitable binding material not shown) the entire rear half of the baler 10 may be swung upwardly and rearwardly about a pivot axis 132 adjacent the upper extremity of the baler 10 so as to permit the finished bale 130 to be discharged onto the ground. As will be understood by those skilled in the art, the sidewalls 12,14 are divided into front and rear portions to permit such discharging action, the dividing line for such portions being substantially along the line 134 illustrated in FIG. 3. The rollers 30, 32, 34, 36 and 38 swing with the rear half of the baler 10 during such discharge, and after this action is completed, the rear half of the baler 10 is swung back downwardly to its normal position whereupon all of the components resume the condition of FIGS. 1 and 3.

It is important to note that the arm assembly 70 itself applies a downardly directed compacting force to the bale during its formation, such force being transmitted to the bale via the rollers 58 and 60 which normally ride directly on the periphery of the bale as illustrated, for example, in FIG. 4. Similarly, the belt stretches 52 and 54 are applying compacting force to the bale throughout the forming process.

However, both of such force-applying structures are controlled by a common source of tensioning force, i.e., the spring assemblies 126. Thus, the downwardly directed force applied by the rollers 58 and 60 cannot get out of balance with respect to the more laterally directed forces applied by the belt stretches 52 and 54. Hence, this uniformity of compressive force about the periphery of the forming bale helps assure that the bale will indeed be circular, not elliptical, in cross-sectional configuration.

In the same vein, but looked at from a slightly different perspective, the rollers 58,60 essentially control the growth of the chamber 16 in a vertical direction while the belt stretches 52,54 essentially control growth in the chamber 16 in lateral respects. Inasmuch as growth of the chamber 16 in these two dimensions is controlled by a common source, growth in one dimension cannot exceed growth in the other dimension and vice versa such that a properly configurated bale will be the result.

It is not unusual during formation of a bale for slugs or wads of crop material to suddenly enter the bale chamber 16, such a situation being illustrated in FIG. 5 wherein the numeral 136 has been used to designate a slug of material immediately after the same has passed through the entrance 26 and is directly above the lower roller 30. The presence of such slug 136 has the effect of pushing the partially formed bale 130 upwardly out of its normal position illustrated by phantom lines in that figure wherein the bottom periphery of the bale 130 would be riding virtually directly upon the lower roll 30. If the increased upwardly directed force from the bale 130 had been caused simply by an increase in the overall diameter thereof, the result would have been to swing the arm assembly 70 further upwardly so as to pay out additional needed belt lengths to the stretches 52 and 54. Thus, normally the lever assembly 64 and the arm assembly 70 swing upwardly as a unit.

However, if such unitary movement of the lever assembly 64 and the arm assembly 70 were to take place during the situation as now being described in which a slug 136 enters the chamber 16, additional, unwanted belt length would be paid out. That is, while additional belt length would indeed be needed to make room vertically for the slug 136, no additional belt length would be required for circumferential growth of the bale 130 since the bale itself did not grow. Hence, the additional belt length provided by the rollers 58,60 moving upwardly could be tolerated, but that additional length provided by the slack-takeup roller 80 also moving upwardly would produce a substantial amount of additional slack in the belt stretches 52,54 that could not be tolerated.

The result of excessive slack in the belt stretches 52,54 is termination of the driving force to the bale 130, and consequently, the bale 130 simply stops rolling and keeps additional crop material from entering the chamber 16. Thus, unless the operator immediately stops forward progress of the machine, the entrance 26 might plug with material, necessitating a tedious and time-consuming manual unplugging operation.

By virtue of the fact that the retaining rollers 58,60 and the slack-takeup roller 80 are carried by the lever assembly 64 on opposite sides of the fulcrum 76, however, the momentary need for an increase in the vertical dimension of the bale chamber 16 by the entry of slugs 136 can be accommodated without the arm assembly 70 swinging upwardly at all. In this regard, as illustrated in FIG. 5, when the slug 136 forces the bale 130 to exert an extra, abrupt, upwardly directed force on the rollers 58,60, the lever assembly 64 simply rocks in a clockwise direction viewing FIG. 5 about the fulcrum pivot 76 against the resistance provided by tension springs 90. Thus, the rollers 58,60 move upwardly to increase the vertical dimension of the chamber 16, yet the slack-takeup roller 80 swings downwardly so as to take up rather than pay out belt length during that interval. Furthermore, because the takeup roller 80 is located a greater distance from the fulcrum pivot 76 than the rollers 58,60 the roller 80 actually takes up more slack than the rollers 58,60 pay out during such interval, all of which maintains the belt stretches 52,54 in tight driving engagement with the periphery of the bale 130 so as to continue rolling the same. Yet, the slug 136 is well accommodated.

It will be noted by comparing FIGS. 1 and 2 that because the crank 94 (and also the crank 96) buckles during movement between its lowermost position of FIG. 2, the effective length of the crank 94 is progressively shortened during the course of such buckling. Consequently, the mechanical advantage obtained by the tension springs 126 over the arm assembly 70 by the cranks 94 and 96 decreases in the course of buckling by the crank 94,96. Furthermore, by causing the cranks 94,96 to buckle during upward swinging, the outermost tip ends thereof as represented by the fastening means 108 simply do not swing upwardly as far as they would if the cranks 94,96 were rigid between their opposite ends. Hence, the tension springs 126 are not stretched to the extent they otherwise would be, and the force derived from the distance which they do stretch gains less advantage on the arm assembly 70 than would otherwise be the case.

The net result of this phenomenon is that the buckling of the cranks 94,96 can be selectively controlled so as to correspondingly apply a greater or lesser degree of compacting force to the forming bale after initiation of the core thereof then would be the case if such buckling were not provided. Hence, the operator may adjust the baler 10 to yield bales of higher or lower density as he may so choose or to accommodate variations in moisture and crop conditions that may be encountered.

For example, assuming that the apertures 112 represent a so-called "normal" setting, the pin 116 when inserted into the apertures 112 will permit the cranks 94,96 to buckle to the extent illustrated in FIG. 7 and in FIG. 2. Thus, while the cranks 94,96 initially begin the cycle in a straight, unbuckled condition as illustrated in FIG. 1, as the arm assembly 70 is swung upwardly by the growing bale, the cranks 94,96 buckle, although simultaneously additionally stretching the springs 126, until the pins 116 come into abutting engagement with the edges 118 of the inner sections 100 of cranks 94,96. From that point on, further buckling of the cranks 94,96 is prevented and the cranks 94,96 complete their upward swinging movements to additionally stretch the springs 126.

If, instead of the arrangement selected and shown in the figures wherein the pin 116 is received in apertures 112, greater resistance is desired from the tension springs 126 following initial formation of the bale core, the pin 116 need only be removed from the apertures 112 when the cranks 94,96 are in their lowered positions of FIG. 1 (at which time there is no loading on the pins 116 such that removal and repositioning thereof is easily accomplished) and reinserted into apertures 114. Thus, the cranks 94,96 cannot buckle to the previously described extent such that the net resistance exerted by springs 126 to upward swinging of the arm assembly 70 is increased after initiation of the bale core beyond that previously described. Consequently, the operator can either make a denser bale or can simply accommodate lighter crop conditions such as might exist when baling prairie grasses as opposed to alfalfa, for example.

On the other hand, if less resistance is desired from the springs 126 after initial formation of the core, the pins 116 can simply be removed and replaced within the apertures 110, thereby permitting a greater degree of buckling of the cranks 94,96 then would otherwise be true.

Of particular note is the fact that in all three available settings for the cranks 94,96, the same amount of resistance is supplied by the springs 126 at the beginning of the bale cycle when the chamber 16 is empty. Consequently, once the degree of preloading of the springs 126 has been selected such as by adjustment of the bolt-and-nut means 128, this tension will remain constant to produce cores of uniform density regardless of the greater or lesser degree of density which will subsequently be obtained in the remaining, radially outwardly disposed portions of the bale. This has been found to be a particular advantage insofar as maintaining circular integrity of the bale is concerned after prolonged storage on a supporting surface, under which conditions the bales tend to flatten out. If the bale core can be kept relatively tight regardless of the density of the remaining portion of the bales, the bales will have a greater resistance to flattening out.

We claim:

1. In a rotary baler:
   flexible web means including a pair of normally oppositely moving stretches cooperating to at least partially define a baling chamber and to apply rolling and compressive force to a bale during formation thereof within the chamber;
   means for holding said stretches apart at a first location to define an entrance to the chamber;
   a device for holding said stretches together at a second location to essentially close off the periphery of the chamber except for said entrance;
   slack-takeup means engageable with said web means;
   a support shiftable toward and away from said holding means;
   means mounting said device and said takeup means on said support for determining the size of said chamber and the length of said stretches as a function of the proximity of the support to said holding means; and
   means yieldably biasing said support toward said holding means.

2. In a rotary baler as claimed in claim 1, wherein said support is swingably mounted for carrying out said shifting thereof.

3. In a rotary baler as claimed in claim 1, wherein said stretches comprise linearly interconnected portions of the same web.

4. In a rotary baler as claimed in claim 3, wherein said support is swingably mounted for carrying out said shifting, said device and said takeup means being carried by said support at spaced positions from the axis of swinging movement of the support.

5. In a rotary baler as claimed in claim 4, wherein said support includes an arm and a lever pivotally connected to the outer end of said arm, said device and said takeup means being carried by said lever on opposite sides of the pivoting axis of the lever, said web being entrained about said takeup means in such manner that said takeup means takes up web when said lever pivots about its connection with the arm in a direction to enlarge the baling chamber by moving said device away from said holding means, said lever being provided with means yieldably restraining the same against said pivoting relative to the device.

6. In a rotary baler as claimed in claim 5, wherein said arm is provided with stop means, said restraining means biasing the lever against said stop means.

7. In a rotary baler as claimed in claim 1, wherein said device comprises a pair of rollers spaced apart sufficiently in a transverse direction to receive said stretches therebetween.

8. In a rotary baler as claimed in claim 1, wherein said support is swingably mounted for carrying out said shifting thereof and is provided with a crank for receiving the force of said biasing means, said biasing means being connected to said crank adjacent the outer end thereof and said crank having means for selective changing of the effective length thereof so as to permit selective adjustment of the force imparted to the support by said biasing means.

9. In a rotary baler as claimed in claim 8, wherein said crank comprises an inner section, an outer section, a pivot interconnecting said sections, and selectively positionable means to limiting the extent of relative pivoting of said sections.

10. In a rotary baler as claimed in claim 9, wherein said biasing means is so disposed relative to said crank as to cause the line of force applied by the biasing means to substantially intersect the axis of swinging movement of said crank when the device is at its closest position to the holding means.

11. Bale tensioning apparatus in a rotary baler including:
    a crank;
    yieldable means coupled with the crank adjacent its outer end for biasing the same in one direction of swinging movement about an axis at its inner end;
    structure engageable with a bale during formation thereof and shiftable by the bale as the latter grows during said formation; and
    means operably coupling the structure with said crank for swinging the latter in the opposite direction during growth of the bale against the resistance of said yieldable means,
    said crank having a joint intermediate said opposite ends of buckling of the crank during said swinging thereof.

12. Bale tensioning apparatus as claimed in claim 11, wherein said crank has a pair of sections interconnected by a pivot that defines said joint; and stop means selectively positionable at any one of a number of locations between said sections for limiting the extent of said buckling.

13. Bale tensioning apparatus as claimed in claim 12, wherein said yieldable means is so disposed relative to said crank as to cause the line of force applied by the yieldable means to substantially intersect the axis of swinging movement of the crank when the latter is unbuckled and said sections are in substantial end-to-end alignment.

14. Bale tensioning apparatus as claimed in claim 13, wherein said stop means is out of engagement with one of said crank sections in any of said locations thereof when said sections are in said substantially aligned condition.

15. Bale tensioning apparatus as claimed in claim 11, wherein said structure is swingable about an axis coinciding with the axis of swinging movement of said crank in carrying out said shifting, said coupling means including a torque member disposed in coaxial reltionship with said axes and rigidly affixed to the structure and the crank.

* * * * *